US008066609B2

(12) United States Patent
Kersting

(10) Patent No.: US 8,066,609 B2
(45) Date of Patent: Nov. 29, 2011

(54) ELECTRIC VARIABLE TRANSMISSION FOR HYBRID ELECTRIC VEHICLES WITH THREE FORWARD MODES, ONE REVERSE MODE, AND FIVE FIXED GEARS

(75) Inventor: Klaus Kersting, Birmingham, MI (US)

(73) Assignees: Chrysler Group LLC, Auburn Hills, MI (US); Daimler AG, Stuttgart (DE)

( * ) Notice: Subject to any disclaimer, the term of this patent is extended or adjusted under 35 U.S.C. 154(b) by 833 days.

(21) Appl. No.: 12/113,984

(22) Filed: May 2, 2008

(65) Prior Publication Data

US 2009/0275438 A1    Nov. 5, 2009

(51) Int. Cl.
*F16H 3/44* (2006.01)
(52) U.S. Cl. .................. 475/282; 475/275; 475/330
(58) Field of Classification Search .............. 475/5, 282, 475/296, 330, 277, 149, 283, 275; 180/62.21, 180/65.225, 65.24, 65.245, 65.25, 65.26, 180/65.7; 477/3, 4, 5, 6
See application file for complete search history.

(56) References Cited

U.S. PATENT DOCUMENTS

| 6,830,531 | B1 * | 12/2004 | Koenig et al. ............. 475/263 |
| 7,179,187 | B2 * | 2/2007 | Raghavan et al. ............ 475/5 |
| 2003/0078126 | A1 | 4/2003 | Holmes et al. |
| 2004/0121876 | A1 * | 6/2004 | Usoro et al. ................ 475/275 |
| 2006/0027413 | A1 * | 2/2006 | Tabata et al. ................ 180/305 |
| 2007/0042852 | A1 * | 2/2007 | Bucknor et al. ............. 475/5 |
| 2007/0225097 | A1 * | 9/2007 | Raghavan et al. ........... 475/5 |
| 2008/0227577 | A1 * | 9/2008 | Goldschmidt et al. ........ 475/5 |
| 2009/0275436 | A1 * | 11/2009 | Kersting ................... 475/5 |
| 2009/0275437 | A1 * | 11/2009 | Kersting ................... 475/5 |
| 2009/0275438 | A1 * | 11/2009 | Kersting ................... 475/5 |

* cited by examiner

*Primary Examiner* — David D Le
*Assistant Examiner* — Lillian Nguyen
(74) *Attorney, Agent, or Firm* — Frederick A. Krieger

(57) ABSTRACT

The present disclosure provides a power split transmission with three forward Electric Variable Transmission (EVT) modes, one reverse EVT mode, and five fixed gears for use in hybrid electrical vehicles (HEV). The present disclosure utilizes two electric motors ("E-motors"), an engine, three planetary gear sets, three selectively engageable clutches, and two selectively engageable brakes. The clutches and brakes are engaged in different combinations to engage the different gears and EVT modes. In the five fixed gears, power is transmitted only on the mechanical path for the highest transmission efficiency. In the EVT modes, a part of the power is transmitted electrically. Additionally, the present disclosure includes a front E-motor designed allowing scalable E-motors and a modular transmission design and a center E-motor design.

22 Claims, 6 Drawing Sheets

ELECTRIC VARIABLE TRANSMISSION FOR HYBRID ELECTRIC VEHICLES WITH THREE FORWARD MODES, ONE REVERSE MODE, AND FIVE FIXED GEARS

FIELD OF THE DISCLOSURE

The present disclosure relates generally to vehicle transmissions, and more specifically, the present disclosure relates to a power split transmission capable of three forward and one reverse Electric Variable Transmission (EVT) modes and five fixed gears for hybrid electrical vehicles (HEV).

BACKGROUND OF THE DISCLOSURE

A Power Split Transmission (PST) (also known as an Electric Variable Transmission (EVT)) is one type of transmission used for Hybrid Electric Vehicles (HEV). Power split transmissions utilize two electric motors ("E-motors") and require completely new transmission designs over conventional transmissions and existing HEV transmissions with a single E-motor. Power split transmissions utilize epicyclic differential gearing (i.e., planetary gear sets) in a way that a part of the power of the internal combustion engine is transmitted through a mechanical path to the output, and another part is transmitted on an electrical path. The electrical path includes the two E-motors, one of them operating as a motor, and the other as a generator. By varying the speeds of the E-motors, variable transmission ratios are obtained.

Typically, the PST allows no carry over of parts from conventional transmissions resulting in large development costs. However, HEVs with PSTs provide improved fuel economy over traditional series and parallel hybrids because the E-motors not only boost or regenerate during braking, but also allow for variable ratios. Those operations are done in EVT modes. Conventional geared transmissions have a certain number (e.g., four to seven) of gears with fixed ratios. Variable ratios in the EVT modes allow the engine to operate near the best efficient load point. In existing HEV PSTs, high-power E-motors and power electronics are required in order to cover full load engine operation. Existing power split transmissions do not include very low power split ratios, five well-distributed gears, and a front E-motor design.

BRIEF SUMMARY OF THE DISCLOSURE

In various exemplary embodiments, the present disclosure provides a power split transmission with three forward and one reverse Electric Variable Transmission (EVT) modes and five fixed gears for use in hybrid electrical vehicles (HEV). The present disclosure utilizes two electric motors ("E-motors"), an engine, three planetary gear sets, three selectively engageable clutches, and two selectively engageable brakes. The clutches and brakes are engaged in different combinations to engage the different gears and EVT modes. In the five fixed gears, power is transmitted only on the mechanical path for the highest transmission efficiency. In the four EVT modes, a part of the power is transmitted electrically. Additionally, the present disclosure includes a front E-motor design allowing scalable E-motors and a modular transmission design. Alternatively, the E-motors can be located in the middle integrated with the transmission design. In the present invention, one of the modes is optimized for reverse driving. In existing power split transmissions, reverse driving is accomplished in forward modes, which means that only one of the two E-motors is providing the desired reverse torque. In this configuration the dedicated reverse mode allows both E-motors supplying reverse torque and thus requires smaller E-motors for the same reverse output torque.

In an exemplary embodiment, an electric variable transmission with three forward modes, one reverse mode, and five fixed gears includes a first, second, and third planetary gear set, wherein the first, second, and third planetary gear sets are interconnected; an input shaft connected to the second planetary gear set; a first electric motor connected to second planetary gear set and connected to the first planetary gear set through a first selectively engageable clutch; a second electric motor connected to the first and the third planetary gear sets; a transmission housing connected to the first and third planetary gear sets through a first selectively engageable brake and to the third planetary gear set through a second selectively engageable brake; a second selectively engageable clutch connected between the first and second planetary gear set; and an output shaft connected to the third planetary gear set and to the second planetary gear set through a third selectively engageable clutch. The first and third planetary gear sets include a simple planetary gear set, and the second planetary gear set includes a compound planetary gear set.

The first planetary gear set includes a first sun gear, a first ring gear, and a first planetary pinion rotatably mounted on a first planetary carrier, wherein the first planetary pinion is disposed in a meshing relationship with the first sun and first ring gears. The second planetary gear set includes a second sun gear, a second ring gear, and second planetary pinions rotatably mounted on a second planetary carrier, wherein the second planetary pinions are disposed in a meshing relationship with the second sun and second ring gears. The third planetary gear set includes a third sun gear, a third ring gear, and a third planetary pinion rotatably mounted on a third planetary carrier, wherein the third planetary pinion is disposed in a meshing relationship with the third sun and third ring gears.

Connections in the electric variable transmission include: the input shaft connected to the second planetary carrier; the first electric motor connected to the second sun gear and to the first planetary carrier through the first selectively engageable clutch; the second electric motor connected to the first and third sun gear; the first ring gear connected to the second ring gear; the first planetary carrier connected to the second planetary carrier through the second selectively engageable clutch; the second ring gear connected to the output shaft through the third selectively engageable clutch; the second planetary carrier connected to the input shaft; the third sun gear connected to the transmission housing through the first selectively engageable brake; the third ring gear connected to the transmission housing through the second selectively engageable brake; and the third planetary carrier connected to the output shaft. Optionally, the first and second electric motors are disposed in front of the first, second, and third planetary gear sets. The electric variable transmission includes three forward electric variable transmission modes, one reverse electric variable transmission mode, and five fixed gears; and the three forward electric variable transmission modes, one reverse electric variable transmission mode, and five fixed gears are selectively engageable through the first, second, and third selectively engageable clutches and the first and second selectively engageable brakes.

In another exemplary embodiment, an electric variable transmission with three forward modes, one reverse mode, and five fixed gears, includes a first, second, and third planetary gear set, wherein the first, second, and third planetary gear sets are interconnected; an input shaft connected to the third planetary gear set; a first electric motor connected to the third planetary gear set and to the second planetary gear set through a first selectively engageable clutch; a second electric motor connected to first planetary gear set; a transmission housing connected to the first planetary gear set through a first selectively engageable brake and a second selectively engageable brake; a second selectively engageable clutch connected between the second and third planetary gear set; and an output shaft connected to the first planetary gear set and the third planetary gear set through a third selectively engageable clutch. The first and second planetary gear sets include a simple planetary gear set, and wherein the third planetary gear set includes a compound planetary gear set.

The first planetary gear set includes a first sun gear, a first ring gear, and a first planetary pinion rotatably mounted on a first planetary carrier, wherein the first planetary pinion is disposed in a meshing relationship with the first sun and first ring gears. The second planetary gear set includes a second sun gear, a second ring gear, and a second planetary pinion rotatably mounted on a second planetary carrier, wherein the second planetary pinion is disposed in a meshing relationship with the second sun and second ring gears. The third planetary gear set includes a third sun gear, a third ring gear, and third planetary pinions rotatably mounted on a third planetary carrier, wherein the third planetary pinions are disposed in a meshing relationship with the third sun and third ring gears.

Connections in the electric variable transmission include the input shaft connected to the third planetary carrier; the first electric motor connected the third sun gear and to the second planetary carrier through the first selectively engageable clutch; the second electric motor connected to the first sun gear; the first sun gear connected to the transmission housing through the first selectively engageable brake; the first ring gear connected to the transmission housing through the second selectively engageable brake; the first planetary carrier connected to the output shaft; the second sun gear connected to the first sun gear; the second ring gear connected to the third ring gear; the second planetary carrier connected to the third planetary carrier through the second selectively engageable clutch; and the third ring gear connected to the output shaft through the third selectively engageable clutch. The first and second electric motors are disposed in front of the first, second, and third planetary gear sets. The electric variable transmission includes three forward electric variable transmission modes, one reverse electric variable transmission mode, and five fixed gears; and the three forward electric variable transmission modes, one reverse electric variable transmission mode, and five fixed gears are selectively engageable through the first, second, and third selectively engageable clutches and the first and second selectively engageable brakes.

In yet another exemplary embodiment, an electric variable transmission with three forward modes, one reverse mode, five fixed gears, and a center E-motor design, includes a first, second, and third planetary gear set, wherein the first, second, and third planetary gear sets are interconnected; an input shaft connected to the second planetary gear set; a first electric motor connected to second planetary gear set; a second electric motor connected to the first and the third planetary gear sets, wherein the first and second electric motors are located between the second and the third planetary gear sets; a transmission housing connected to the first and the third planetary gear sets through a first selectively engageable brake and to the third planetary gear set through a second selectively engageable brake; a first selectively engageable clutch and a second selectively engageable clutch connected between the first and second planetary gear set; and an output shaft connected to the third planetary gear set and to the first planetary gear set through a third selectively engageable clutch. The first and third planetary gear sets include a simple planetary gear set, and wherein the second planetary gear set includes a compound planetary gear set.

The first planetary gear set includes a first sun gear, a first ring gear, and a first planetary pinion rotatably mounted on a first planetary carrier, wherein the first planetary pinion is disposed in a meshing relationship with the first sun and first ring gears. The second planetary gear set includes a second sun gear, a second ring gear, and second planetary pinions rotatably mounted on a second planetary carrier, wherein the second planetary pinions are disposed in a meshing relationship with the second sun and second ring gears. The third planetary gear set includes a third sun gear, a third ring gear, and a third planetary pinion rotatably mounted on a third planetary carrier, wherein the third planetary pinion is disposed in a meshing relationship with the third sun and third ring gears.

Connections in the electric variable transmission include: the input shaft connected to the second planetary carrier; the first electric motor connected to the second sun gear; the second electric motor connected to the first and third sun gear; the first ring gear connected to the second ring gear and to the output shaft through the third selectively engageable clutch; the first planetary carrier connected to the second planetary carrier through the second selectively engageable clutch and to the second sun gear through the first selectively engageable clutch; the second ring gear connected to the first ring gear; the second planetary carrier connected to the input shaft, to the first planetary carrier through the second selectively engageable clutch, and to the second sun gear through the first selectively engageable clutch; the third sun gear connected to the transmission housing through the first selectively engageable brake, to the second electric motor, and to the first sun gear; the third ring gear connected to the transmission housing through the second selectively engageable brake; and the third planetary carrier connected to the output shaft and to the first ring gear through the third selectively engageable clutch. The electric variable transmission includes three forward electric variable transmission modes, one reverse electric variable transmission mode, and five fixed gears; and the three forward electric variable transmission modes, one reverse electric variable transmission mode, and five fixed gears are selectively engageable through the first, second, and third selectively engageable clutches and the first and second selectively engageable brakes.

In yet another exemplary embodiment, an electric variable transmission with three forward modes, one reverse mode, five fixed gears, and a front and center E-motor design includes a first, second, and third planetary gear set, wherein the first, second, and third planetary gear sets are interconnected; an input shaft connected to the first planetary gear set; a first electric motor connected to the first planetary gear set and to the second planetary gear set through a first selectively engageable clutch; a second electric motor connected to the first and the third planetary gear sets, wherein the second electric motor is located between the second and the third planetary gear sets; a transmission housing connected to the second planetary gear set through an overrunning clutch and to the third planetary gear set through a first selectively engageable brake; a second selectively engageable clutch connected between the first and second planetary gear set; a second selectively engageable brake connected between the second and third planetary gear sets and the second electric motor; and an output shaft connected to the third planetary gear set and to the first and second planetary gear sets through a third selectively engageable clutch. The first and second planetary gear sets include a compound planetary gear set, and the second planetary gear set includes a simple planetary gear set.

The first planetary gear set includes a first sun gear, a first ring gear, and first planetary pinions rotatably mounted on a first planetary carrier, wherein the first planetary pinions are disposed in a meshing relationship with the first sun and first ring gears. The second planetary gear set includes a second sun gear, a second ring gear, and second planetary pinions rotatably mounted on a second planetary carrier, wherein the second planetary pinions are disposed in a meshing relationship with the second sun and second ring gears. The third planetary gear set includes a third sun gear, a third ring gear, and a third planetary pinion rotatably mounted on a third planetary carrier, wherein the third planetary pinion is disposed in a meshing relationship with the third sun and third ring gears.

Optionally, connections in the electric variable transmission include: the input shaft connected to the first planetary carrier; the first electric motor connected to the first sun gear and the second ring gear through the first selectively engageable clutch; the second electric motor connected to the second sun gear, the third sun gear, and the second selectively engageable brake; the first ring gear connected to the second planetary carrier and to the output shaft through the third selectively engageable clutch; the first planetary carrier connected to the input shaft and to the second ring gear through the second selectively engageable clutch; the second sun gear connected to the second electric motor, to the transmission housing through the second selectively engageable brake, and to the third sun gear; the second ring gear connected to the first planetary carrier through the second selectively engageable clutch and to the first electric motor and the first sun gear through the first selectively engageable clutch; the second planetary carrier connected to the first ring gear, to the overrunning clutch, and to the output shaft through the third selectively engageable clutch; the third sun gear connected to the transmission housing through the second selectively engageable brake, to the second electric motor, and to the second sun gear; the third ring gear connected to the transmission housing through the first selectively engageable brake; and the third planetary carrier connected to the output shaft and to the second planetary carrier and the first ring gear through the third selectively engageable clutch.

Alternatively, connections in the electric variable transmission include: the input shaft connected to the first planetary carrier; the first electric motor connected to the first sun gear and the second ring gear through the first selectively engageable clutch; the second electric motor connected to the second sun gear, the third sun gear, and to the transmission housing through the second selectively engageable brake; the first ring gear connected to the second planetary carrier and to the output shaft through the third selectively engageable clutch; the first planetary carrier connected to the input shaft and to the second ring gear through the second selectively engageable clutch; the second sun gear connected to the second electric motor, to the transmission housing through the second selectively engageable brake, and to the third sun gear; the second ring gear connected to the first planetary carrier through the second selectively engageable clutch and to the first electric motor and the first sun gear through the first selectively engageable clutch; the second planetary carrier connected to the first ring gear, to the overrunning clutch, and to the output shaft through the third selectively engageable clutch; the third sun gear connected to the transmission housing through the second selectively engageable brake, to the second electric motor, and to the second sun gear; the third ring gear connected to the transmission housing through the first selectively engageable brake; and the third planetary carrier connected to the output shaft and to the second planetary carrier and the first ring gear through the third selectively engageable clutch.

BRIEF DESCRIPTION OF THE DRAWINGS

The present disclosure is illustrated and described herein with reference to the various drawings, in which like reference numbers denote like system components, respectively, and in which.

DETAILED DESCRIPTION OF THE DISCLOSURE

In various exemplary embodiments, the present disclosure provides a power split transmission with three forward and one reverse Electric Variable Transmission (EVT) modes and five fixed gears for use in hybrid electrical vehicles (HEV). The present disclosure utilizes two electric motors ("E-motors"), an engine, three planetary gear sets, and five selectively engageable clutches. The clutches are engaged in different combinations to engage the different gears and EVT modes. In the five fixed gears, power is transmitted only on the mechanical path for the highest transmission efficiency. In the four EVT modes, a part of the power is transmitted electrically. Additionally, the present disclosure includes a front E-motor designed allowing scalable E-motors and a modular transmission design. Alternatively, the E-motors can be located in the middle integrated with the transmission design.

The present disclosure provides four EVT modes (three forward and one reverse) and five fixed gears to enable both an optimal fuel efficiency and excellent performance. Generally, EVT modes are more efficient in low load operation, such as for city driving. Fixed gears are more efficient for higher load operation. The present disclosure utilizes five clutches and three planetary gear sets to provide the four EVT modes and five fixed gears. The four EVT modes are designed to cover any ratio, i.e. full coverage. The five fixed gears are designed to specific ratios, and are mainly used at full and high loads.

In the present invention, one of the modes is optimized for reverse driving. In existing power split transmissions, reverse driving is accomplished in forward modes, which means that only one of the two E-motors is providing the desired reverse torque. In this configuration the dedicated reverse mode allows both E-motors supplying reverse torque and thus requires smaller E-motors for the same reverse output torque.

The various exemplary embodiments of the multi-mode power split transmission with four EVT modes and five fixed gears are illustrated in various transmission schematic diagrams (also known as transmission stick diagrams). These schematic diagrams illustrate the topology, packaging, and location of planetary gear sets, clutches, motors, shafts, and the like. The schematic diagram is a visual representation of a cross-section of a transmission showing positioning and in what manner components are supported and interconnected. Additionally, the schematic diagrams show how various clutches and brakes are positioned and supported between or adjacent to planetary gear sets. Those of ordinary skill in the art recognize the schematic diagrams correspond to actual implementations of planetary gear sets, engines, clutches, and the like.

Figure 1:
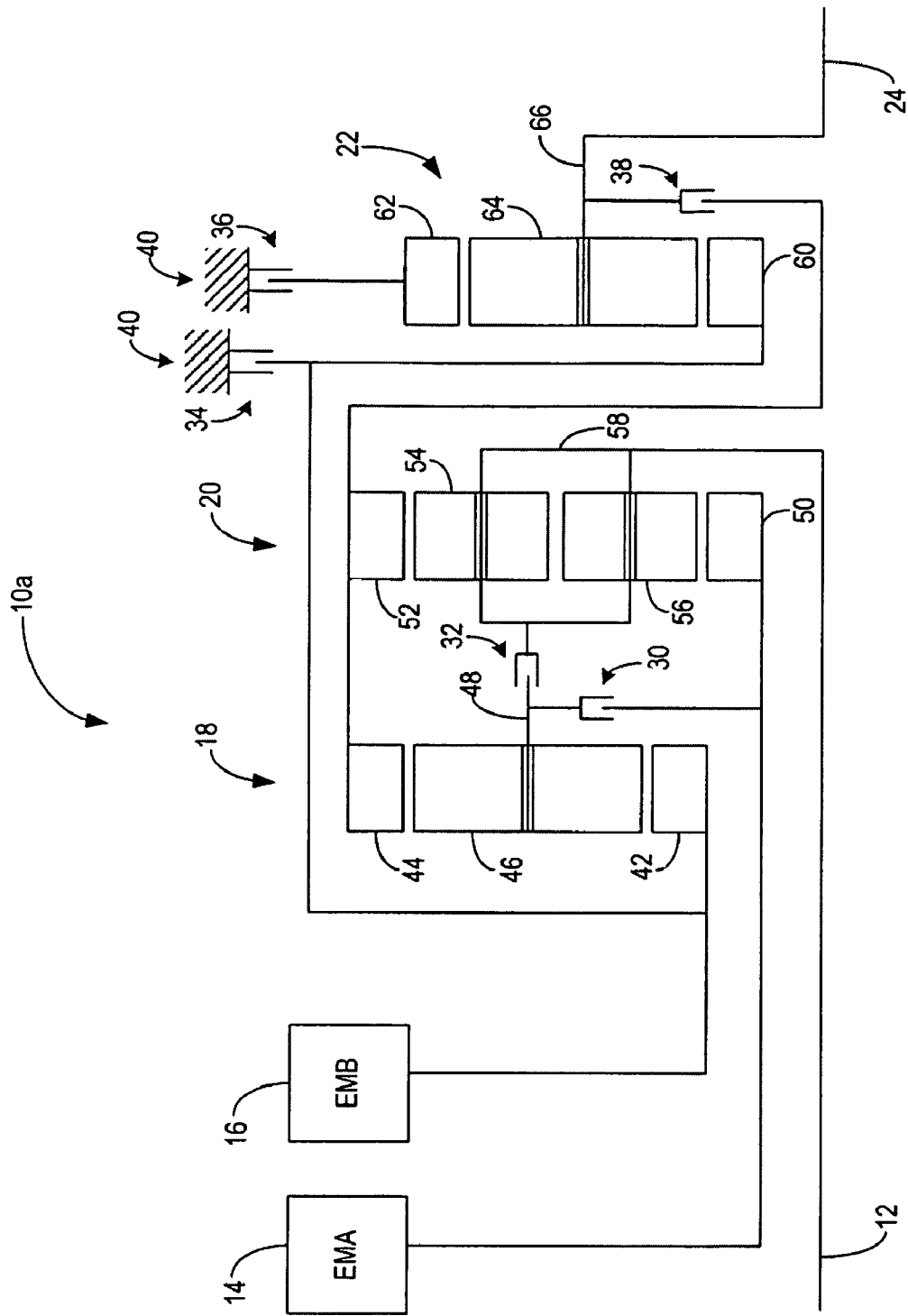
FIG. 1 is a schematic diagram of a power split transmission including two E-motors located in front of three planetary gear sets according to an exemplary embodiment of the present disclosure.

Referring to FIG. 1, a power split transmission 10a includes an input shaft 12, a first E-motor ("EMA") 14, a second E-motor ("EMB") 16, a first planetary gear set 18, a second planetary gear set 20, a third planetary gear set 22, and an output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate power and boost the vehicle and to drive in variable ratios in different EVT modes.

The power split transmission 10a includes three clutches 30, 32, and 38 and two brakes 34 and 36 which are torque transmitting mechanisms. The clutches 30, 32, and 38 and brakes 34 and 36 are configured to selectively engage and disengage to select fixed gear ratios and EVT modes. For example, all single and double shifts can be performed by shifting from one clutch or brake 30, 32, 34, 36, and 38 to another. The clutches and brakes 30, 32, 34, 36, and 38 are configured to be selectively engaged, and can be operated mechanically, electrically, or hydraulically, as is known in the art. The brakes 34 and 36 are configured to connect to a transmission housing 40. The clutches 30, 32, and 38 are configured to hold various components in the planetary gear sets 18, 20, and 22 to engage various gear ratios.

In this exemplary embodiment, the first and third planetary gear sets 18 and 22 are simple planetary gear sets, and the second planetary gear set 20 is a compound planetary gear set. The first planetary gear set 18 includes a sun gear 42, a ring gear 44, a planetary pinion 46, and a planetary carrier 48. The planetary pinion 46 is rotatably mounted on the planetary carrier 48 disposed in a meshing relationship with the sun gear 42 and the ring gear 44.

The second planetary gear set 20 includes a sun gear 50, a ring gear 52, planetary pinions 54 and 56, and a planetary carrier 58. The planetary pinions 54 and 56 are rotatably mounted on the planetary carrier 58 disposed in a meshing relationship with the sun gear 50 and the ring gear 52. The third planetary gear set 22 includes a sun gear 60, a ring gear 62, a planetary pinion 64, and a planetary carrier 66. The planetary pinion 64 is rotatably mounted on the planetary carrier 66 disposed in a meshing relationship with the sun gear 60 and the ring gear 62.

The power split transmission 10a includes a front E-motor design with the EMA 14 and EMB 16 located in front of the three planetary gear sets 18, 20, and 22. This allows the EMA 14 and EMB 16 to be assembled separately from the three planetary gear sets 18, 20, and 22 leading to a modular design. For example, the modular design enables separate manufacturing of the gear sets 18, 20, and 22 from the E-motors 14 and 16.

With regards to the connections in the planetary gear set 18, the sun gear 42 is connected to the EMB 16 and to the transmission housing 40 through the brake 34. The ring gear 44 is connected to the ring gear 52 of the second planetary gear set 20. The planetary carrier 48 is connected to the EMA 14 through the clutch 30 and to the planetary carrier 58 through the clutch 32.

With regards to the connections in the second planetary gear set 20, the sun gear 50 is connected to the EMA 14. The ring gear 52 is connected to the output shaft 24 through the clutch 38. The planetary carrier 58 is connected to the input shaft 12. With regards to connections in the third planetary gear set 22, the sun gear 60 is connected to the transmission housing 40 through the clutch 34 and to the EMB 16. The ring gear 62 is connected to the transmission housing 40 through the brake 36. The planetary carrier 66 is connected to the output shaft 24.

Figure 2:
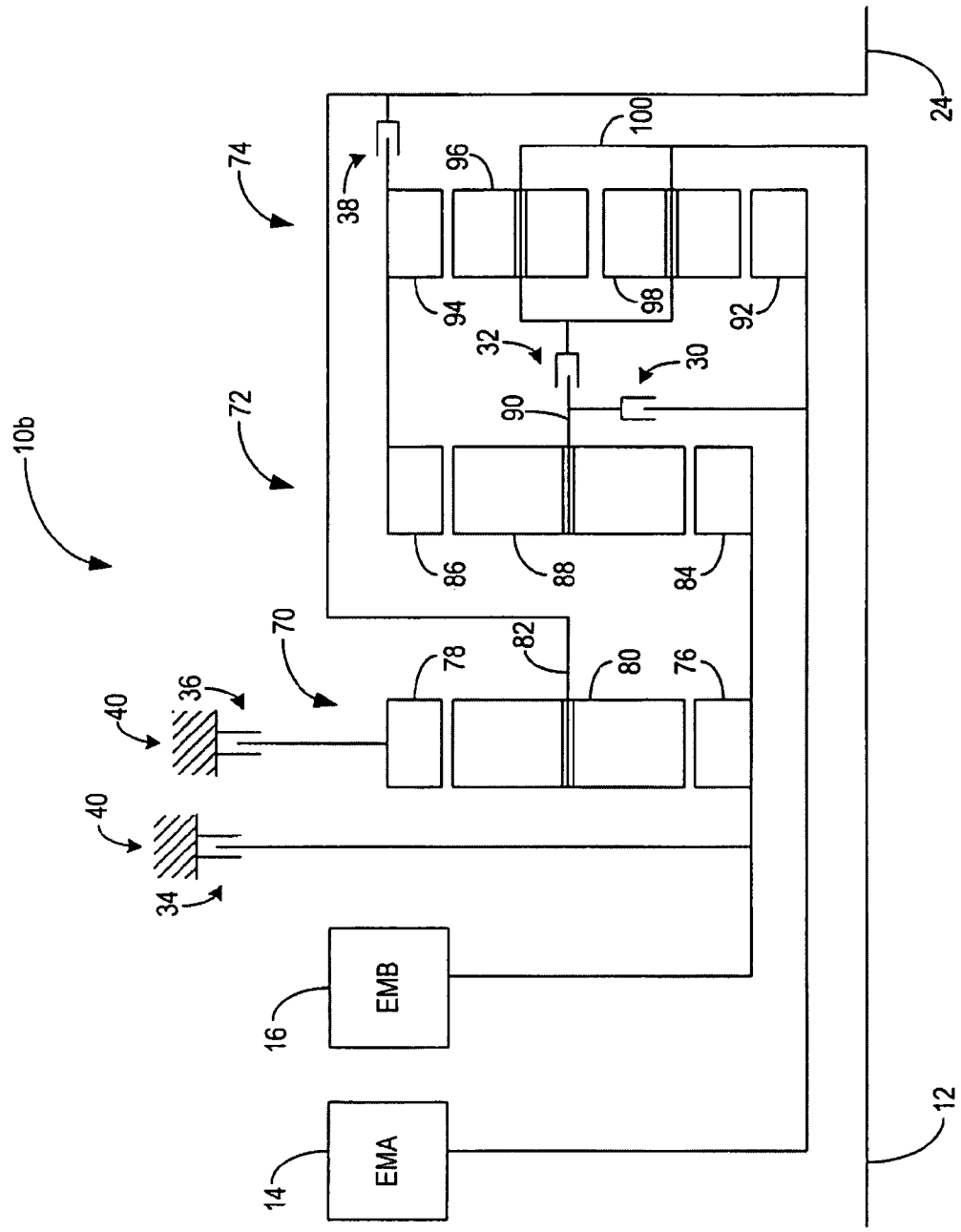
FIG. 2 is a schematic diagram of a power split transmission including two E-motors located in front of three planetary gear sets according to another exemplary embodiment of the present disclosure.

Referring to FIG. 2, a power split transmission 10b includes the input shaft 12, EMA 14, EMB 16, a first planetary gear set 70, a second planetary gear set 72, a third planetary gear set 74, and the output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate and store power and to drive in variable ratios in different EVT modes.

The power split transmission 10b includes three clutches 30, 32, and 38 and two brakes 34 and 36 which are torque transmitting mechanisms. The clutches and brakes 30, 32, 34, 36, and 38 are configured to selectively engage and disengage to select fixed gear ratios and EVT modes. For example, all single and double shifts can be performed by shifting from one clutch or brake 30, 32, 34, 36, and 38 to another. The clutches and brakes 30, 32, 34, 36, and 38 are configured to be selectively engaged, and can be operated mechanically, electrically, or hydraulically, as is known in the art. The brakes 34 and 36 are configured to connect to a transmission housing 40. The clutches and brakes 30, 32, 34, 36, and 38 are configured to hold various components in the planetary gear sets 70, 72, and 74 to engage various gear ratios.

In this exemplary embodiment, the first and second planetary gear sets 70 and 72 are simple planetary gear sets, and the third planetary gear set 74 is a compound planetary gear set. The first planetary gear set 70 includes a sun gear 76, a ring gear 78, a planetary pinion 80, and a planetary carrier 82. The planetary pinion 80 is rotatably mounted on the planetary carrier 82 disposed in a meshing relationship with the sun gear 76 and the ring gear 78.

The second planetary gear set 72 includes a sun gear 84, a ring gear 86, a planetary pinion 88, and a planetary carrier 90. The planetary pinion 88 is rotatably mounted on the planetary carrier 90 disposed in a meshing relationship with the sun gear 84 and the ring gear 86. The third planetary gear set 74 includes a sun gear 92, a ring gear 94, planetary pinions 96 and 98, and a planetary carrier 100. The planetary pinions 96 and 98 are rotatably mounted on the planetary carrier 100 disposed in a meshing relationship with the sun gear 92 and the ring gear 94.

The power split transmission 10b includes a front E-motor design with the EMA 14 and EMB 16 located in front of the three planetary gear sets 70, 72, and 74. This allows the EMA 14 and EMB 16 to be assembled separately from the three planetary gear sets 70, 72, and 74 leading to a modular design. For example, the modular design enables separate manufacturing of the gear sets 70, 72, and 74 from the E-motors 14 and 16.

With regards to the connections in the planetary gear set 70, the sun gear 76 is connected to the EMB 16 and to the transmission housing 40 through the brake 34. The ring gear 78 is connected to the transmission housing 40 through the brake 36. The planetary carrier 82 is connected to the output shaft 24.

With regards to the connections in the planetary gear set 72, the sun gear 84 is connected to the sun gear 76 of the first planetary gear set 70. The ring gear 86 is connected to the ring gear 94 of the third planetary gear set 94. The planetary carrier 90 is connected to the EMA 14 through the clutch 30 and to the planetary carrier 100 of the third planetary gear set through the clutch 32. With regards to the connections in the planetary gear set 74, the sun gear 92 is connected to the EMA 14. The ring gear 94 is connected to the output shaft 24 through the clutch 38. The planetary carrier 100 is connected to the input shaft 12.

Figure 3:
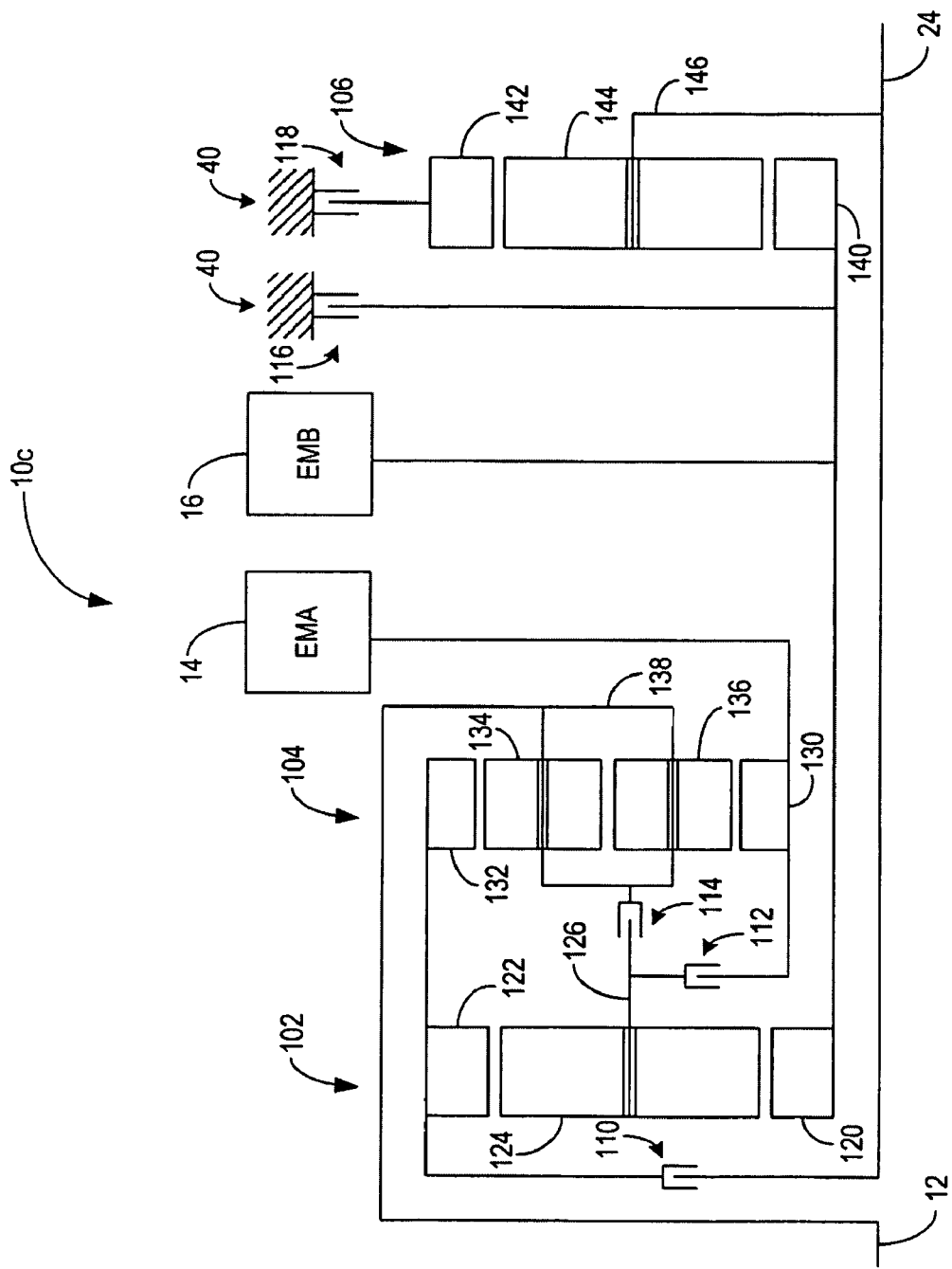
FIG. 3 is a schematic diagram of a power split transmission including two E-motors located in between three planetary gear sets according to yet another exemplary embodiment of the present disclosure.

Referring to FIG. 3, a power split transmission 10c includes the input shaft 12, EMA 14, EMB 16, a first planetary gear set 102, a second planetary gear set 104, a third planetary gear set 106, and the output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate and store power and to drive in variable ratios in different EVT modes.

The power split transmission 10c includes three clutches 110, 112, and 114 and two brakes 116 and 118 which are torque transmitting mechanisms. The clutches and brakes 110, 112, 114, 116, and 118 are configured to selectively engage and disengage to select fixed gear ratios and EVT modes. For example, all single and double shifts can be performed by shifting from one clutch or brake 110, 112, 114, 116, and 118 to another. The clutches and brakes 110, 112, 114, 116, and 118 are configured to be selectively engaged, and can be operated mechanically, electrically, or hydraulically, as is known in the art. The brakes 116 and 118 are configured to connect to a transmission housing 40. The clutches and brakes 110, 112, 114, 116, and 118 are configured to hold various components in the planetary gear sets 102, 104, and 106 to engage various gear ratios.

In this exemplary embodiment, the first and third planetary gear sets 102 and 106 are simple planetary gear sets, and the second planetary gear set 104 is a compound planetary gear set. The first planetary gear set 102 includes a sun gear 120, a ring gear 122, a planetary pinion 124, and a planetary carrier 126. The planetary pinion 124 is rotatably mounted oh the planetary carrier 126 disposed in a meshing relationship with the sun gear 120 and the ring gear 122.

The second planetary gear set 104 includes a sun gear 130, a ring gear 132, planetary pinions 134 and 136, and a planetary carrier 138. The planetary pinions 134 and 136 are rotatably mounted on the planetary carrier 138 disposed in a meshing relationship with the sun gear 130 and the ring gear 132. The third planetary gear set 106 includes a sun gear 140, a ring gear 142, a planetary pinion 144, and a planetary carrier 146. The planetary pinion 144 is rotatably mounted on the planetary carrier 146 disposed in a meshing relationship with the sun gear 140 and the ring gear 142.

The power split transmission 10c includes an E-motor design with the EMA 14 and EMB 16 located in between the second and third planetary gear sets 104 and 106. This allows the EMA 14 and EMB 16 to be the same type of module. Note, in this exemplary embodiment, the E-Motors 14 and 16 are assembled with the transmission 10c.

With regards to the connections in the planetary gear set 102, the sun gear 120 is connected to the sun gear 140 of the third planetary gear set 106, the EMB 14, and the brake 116. The ring gear 122 is connected to the ring gear 132 of the second planetary gear set 104 and to the clutch 110 which connects to the output shaft 24. The planetary carrier 126 is connected to the clutches 112 and 114. The clutch 112 is connected to the ring gear 130 of the second planetary gear set 104, and the clutch 114 is connected to the planetary carrier 138 of the second planetary gear set 104.

With regards to the connections in the planetary gear set 104, the sun gear 130 is connected to the clutch 112 and the EMA 12. The ring gear 132 is connected to the ring gear 122 of the first planetary gear set 102. The planetary carrier 138 is connected to the clutch 114 and the input shaft 12. With regards to the connections in the planetary gear set 106, the sun gear 140 is connected to the EMB 16, the brake 116, and the sun gear 120 of the first planetary gear set 102. The ring gear 142 is connected to the brake 118. The planetary carrier 146 is connected to the output shaft 24.

Figure 4:
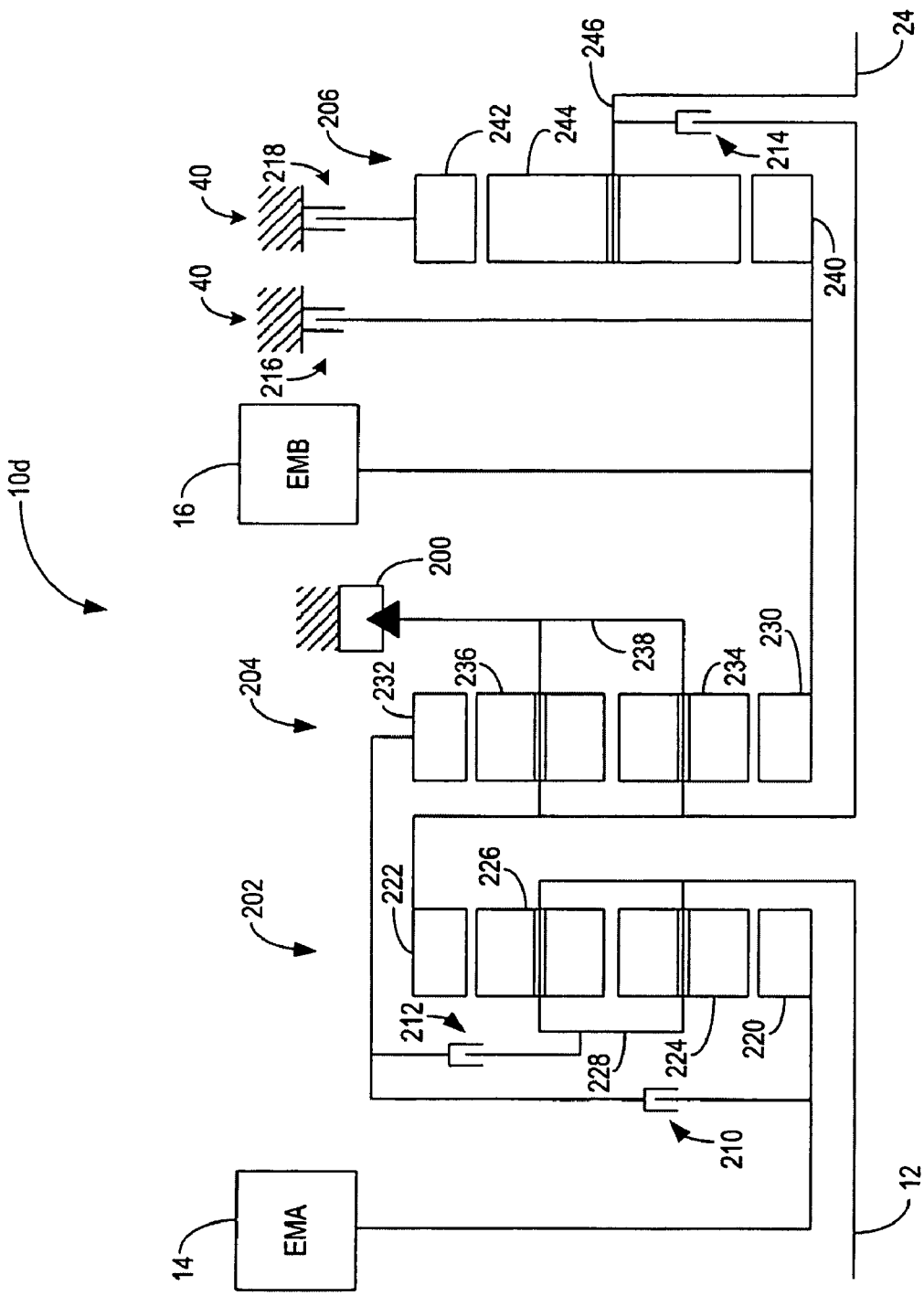
FIG. 4 is a schematic diagram of a power split transmission including two E-motors with one motor located in between three planetary gear sets and one motor in front along with an overrunning clutch according to yet another exemplary embodiment of the present disclosure.

Referring to FIG. 4, a power split transmission 10d with an overrunning clutch (OC) 200 includes the input shaft 12, EMA 14, EMB 16, a first planetary gear set 202, a second planetary gear set 204, a third planetary gear set 206, and the output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate and store power and to drive in variable ratios in different EVT modes.

The power split transmission 10d includes three clutches 210, 212, and 214 and two brakes 216 and 218 which are torque transmitting mechanisms. The clutches and brakes 210, 212, 214, 216, and 218 are configured to selectively engage and disengage to select fixed gear ratios and EVT modes. For example, all single and double shifts can be performed by shifting from one clutch or brake 210, 212, 214, 216, and 218 to another. The clutches and brakes 210, 212, 214, 216, and 218 are configured to be selectively engaged, and can be operated mechanically, electrically, or hydraulically, as is known in the art. The brakes 216 and 218 are configured to connect to a transmission housing 40. The clutches and brakes 210, 212, 214, 216, and 218 are configured to hold various components in the planetary gear sets 202, 204, and 206 to engage various gear ratios. Additionally, the power split transmission 10d includes the OC 200 to enable engine crank without hydraulic pressure.

In this exemplary embodiment, the first and second planetary gear sets 202 and 204 are compound planetary gear sets, and the third planetary gear set 206 is a simple planetary gear set. The first planetary gear set 202 includes a sun gear 220, a ring gear 222, planetary pinions 224 and 226, and a planetary carrier 228. The planetary pinions 234 and 236 are rotatably mounted on the planetary carrier 228 disposed in a meshing relationship with the sun gear 220 and the ring gear 222.

The second planetary gear set 204 includes a sun gear 230, a ring gear 232, planetary pinions 234 and 236, and a planetary carrier 238. The planetary pinions 234 and 236 are rotatably mounted oh the planetary carrier 238 disposed in a meshing relationship with the sun gear 230 and the ring gear 232. The third planetary gear set 206 includes a sun gear 240, a ring gear 242, a planetary pinion 244, and a planetary carrier 246. The planetary pinion 244 is rotatably mounted on the planetary carrier 246 disposed in a meshing relationship with the sun gear 240 and the ring gear 242.

The power split transmission 10d includes a front and center E-motor design with the EMA 14 located in front of the planetary gear sets 202, 204, and 206, and the EMB 16 located in between the second and third planetary gear sets 204 and 206. This allows the EMA 14 and EMB 16 to be the same type of module. Note, in this exemplary embodiment, the EMA 16 is assembled with the transmission 10d.

With regards to the connections in the planetary gear set 202, the sun gear 220 is connected to the EMA 14 and to the ring gear 232 through the clutch 210. The ring gear 222 is connected to the planetary carrier 238 and to the output shaft 24 through the clutch 214. The planetary carrier 228 is connected to the ring gear 232 through the clutch 212.

With regards to the connections in the planetary gear set 204, the sun gear 230 is connected to the EMB 16, the transmission housing 40 through the brake 216, and the sun gear 240. The ring gear 232 is connected to the planetary carrier 228 through the clutch 212 and the EMA 14 and the sun gear 220 through the clutch 210. The planetary carrier 238 is connected to the OC 200, the ring gear 222, and the output shaft 24 through the clutch 214. With regards to the connections in the planetary gear set 206, the sun gear 240 is connected to the EMB 16, the transmission housing 40 through the brake 216, and the sun gear 230. The ring gear 242 is connected to the transmission housing 40 through the brake 218. The planetary carrier 246 is connected to the output shaft 24.

Figure 5:
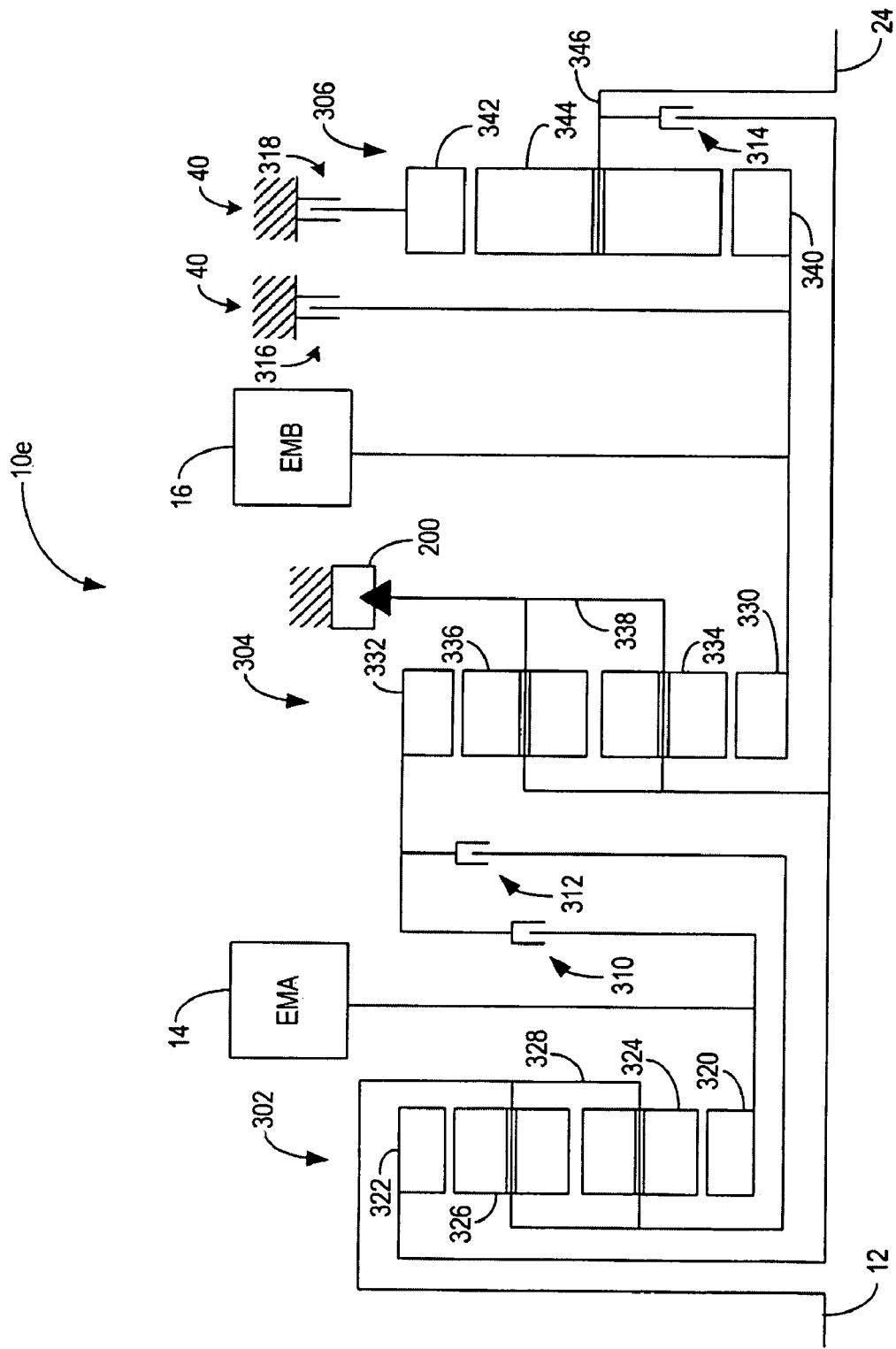
FIG. 5 is a schematic diagram of a power split transmission including two E-motors located in between three planetary gear sets with an overrunning clutch according to yet another exemplary embodiment of the present disclosure.

Referring to FIG. 5, a power split transmission 10e with an overrunning clutch (OC) 200 includes the input shaft 12, EMA 14, EMB 16, a first planetary gear set 302, a second planetary gear set 304, a third planetary gear set 306, and the output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate and store power and to drive in variable ratios in different EVT modes.

The power split transmission 10e includes three clutches 310, 312, and 314 and two brakes 316 and 318 which are torque transmitting mechanisms. The clutches and brakes 310, 312, 314, 316, and 318 are configured to selectively engage and disengage to select fixed gear ratios and EVT modes. For example, all single and double shifts can be performed by shifting from one clutch or brake 310, 312, 314, 316, and 318 to another. The clutches and brakes 310, 312, 314, 316, and 318 are configured to be selectively engaged, and can be operated mechanically, electrically, or hydraulically, as is known in the art. The brakes 316 and 318 are configured to connect to a transmission housing 40. The clutches and brakes 310, 312, 314, 316, and 318 are configured to hold various components in the planetary gear sets 302, 304, and 306 to engage various gear ratios. Additionally, the power split transmission 10e includes the OC 200 to enable engine crank without hydraulic pressure.

In this exemplary embodiment, the first and second planetary gear sets 302 and 304 are compound planetary gear sets, and the third planetary gear set 306 it a simple planetary gear set. The first planetary gear set 302 includes a sun gear 320, a ring gear 322, planetary-pinions 324 and 326, and a planetary carrier 328. The planetary pinions 324 and 326 are rotatably mounted on the planetary carrier 328 disposed in a meshing relationship with the sun gear 320 and the ring gear 322.

The second planetary gear set 304 includes a sun gear 330, a ring gear 332, planetary pinions 334 and 336, and a planetary carrier 338. The planetary pinions 334 and 336 are rotatably mounted on the planetary carrier 338 disposed in a meshing relationship with the sun gear 330 and the ring gear 332. The third planetary gear set 306 includes a sun gear 340, a ring gear 342, a planetary pinion 344, and a planetary carrier 346. The planetary pinion 344 is rotatably mounted on the planetary carrier 346 disposed in a meshing relationship with the sun gear 340 and the ring gear 342.

The power split transmission 10e includes an E-motor design with the EMA 14 located in between the first and second planetary gear sets 302 and 304, and the EMB 16 located in between the second and third planetary gear sets 304 and 306. This allows the EMA 14 and EMB 16 to be the same type of module. Note, in this exemplary embodiment, the E-Motors 14 and 16 are assembled with the transmission 10e.

With regards to the connections in the planetary gear set 302, the sun gear 320 is connected to the EMA 14 and to the ring gear 332 through the clutch 310. The ring gear 322 is connected to the planetary carrier 338 and to the output shaft 24 through the clutch 314. The planetary carrier 328 is connected to the ring gear 332 through the clutch 312 and to the input shaft 12.

With regards to the connections in the planetary gear set 304, the sun gear 330 is connected to the EMB 16, the transmission housing 40 through the brake 316, and the sun gear 340. The ring gear 332 is connected to the planetary carrier 328 through the clutch 312 and the sun gear 320 and the EMA 14 through the clutch 210. The planetary carrier 338 is connected to the OC 200, the planetary carrier 328, and the output shaft 24 through the clutch 314.

With regards to the connections in the planetary gear set 306, the sun gear 340 is connected to the EMB 16, the transmission housing 40 through the brake 316, and the sun gear 330. The ring gear 342 is connected to the transmission housing 40 through the brake 318. The planetary carrier 346 is connected to the output shaft 24.

Figure 6:
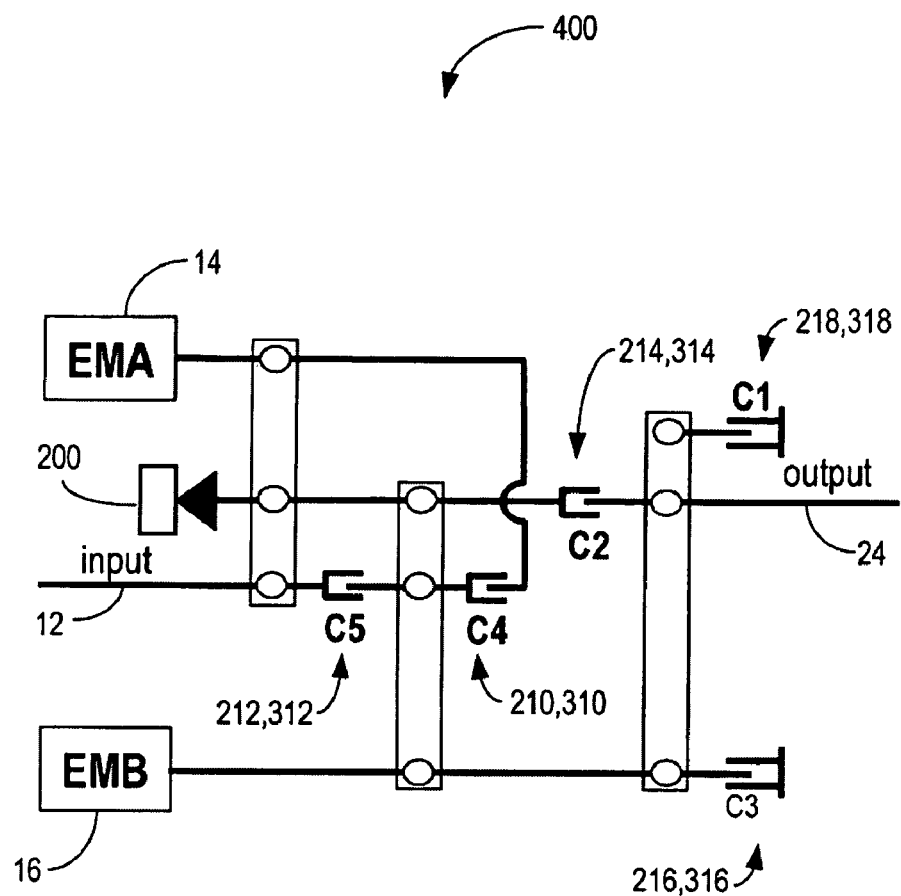
FIG. 6 is a lever diagram illustrating a function of the overrunning clutch from FIGS. 4 and 5 according to an exemplary embodiment of the present disclosure.
Figure 6:
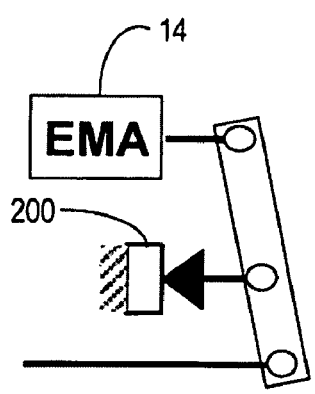

Referring to FIG. 6, a lever diagram 400 illustrates the function of the OC 200 from FIGS. 4 and 6 according to an exemplary embodiment of the present disclosure. The OC 200 is connected to the planetary carriers 238 and 338 in the second planetary gear sets 204 and 304 PGS2 of the power split transmissions 10d and 10e. The OC 200 connects to the transmission housing 40. The OC 200 is configured to enable engine crank without hydraulic pressure possible, i.e. the engine 12 can be cranked with only EMA torque 14 with the EMA 14 turning reverse and reviving up the engine.

Each of the power split transmissions 10a, 10b, 10c, 10d, and 10e support four EVT modes (three forward and one reverse) and five fixed gears through various engagements of the clutches and brakes. The four EVT modes have very low power split rations allowing very low powered E-motors and power electronics. The five fixed gears are well-distributed for high transmission efficiency, such as during high loads and the like. The power split transmission 10b includes a long input shaft 12, but shorter connections between the planetary gear sets 70, 72, and 74. The power split transmission 10c provides no fast turning outer shells. Additionally, those of ordinary skill in the art will recognize that the order of the various gear sets and motors in the power split transmissions 10a, 10b, 10c, 10d, and 10e can be varied.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An electric variable transmission with three forward modes, one reverse mode, and five fixed gears, comprising:
    a first, second, and third planetary gear set, wherein the first, second, and third planetary gear sets are interconnected;
    an input shaft directly connected to the second planetary gear set;
    a first electric motor connected to second planetary gear set and connected to the first planetary gear set through a first selectively engageable clutch;
    a second electric motor connected to the first and the third planetary gear sets;
    a transmission housing connected to the first planetary gear set through a first selectively engageable brake and to the third planetary gear set through a second selectively engageable brake;
    a second selectively engageable clutch connected between the first and second planetary gear set;
    and an output shaft directly connected to the third planetary gear set and to the second planetary gear set through a third selectively engageable clutch.

2. The electric variable transmission of claim 1, wherein the first and third planetary gear sets comprise a simple planetary gear set, and wherein the second planetary gear set comprises a compound planetary gear set.

3. The electric variable transmission of claim 2, wherein the first planetary gear set comprises a first sun gear, a first ring gear, and a first planetary pinion rotatably mounted on a first planetary carrier, wherein the first planetary pinion is disposed in a meshing relationship with the first sun and first ring gears;
    wherein the second planetary gear set comprises a second sun gear, a second ring gear, and second planetary pinions rotatably mounted on a second planetary carrier, wherein the second planetary pinions are disposed in a meshing relationship with the second sun and second ring gears;
    and wherein the third planetary gear set comprises a third sun gear, a third ring gear, and a third planetary pinion rotatably mounted on a third planetary carrier, wherein the third planetary pinion is disposed in a meshing relationship with the third sun and third ring gears.

4. The electric variable transmission of claim 3, wherein connections in the electric variable transmission comprise:
    the input shaft connected to the second planetary carrier;
    the first electric motor connected to the second sun gear and to the first planetary carrier through the first selectively engageable clutch;
    the second electric motor connected to the first and third sun gear;
    the first ring gear connected to the second ring gear;
    the first planetary carrier connected to the second planetary carrier through the second selectively engageable clutch;
    the second ring gear connected to the output shaft through the third selectively engageable clutch;
    the second planetary carrier connected to the input shaft;
    the third sun gear connected to the transmission housing through the first selectively engageable brake;
    the third ring gear connected to the transmission housing through the second selectively engageable brake;
    and the third planetary carrier connected to the output shaft.

5. The electric variable transmission of claim 1, wherein the first and second electric motors are disposed in front of the first, second, and third planetary gear sets.

6. The electric variable transmission of claim 1, wherein the electric variable transmission comprises three forward electric variable transmission modes, one reverse electric variable transmission mode, and five fixed gears;
    and wherein the three forward electric variable transmission modes, one reverse electric variable transmission mode and five fixed gears are selectively engageable through the first, second, and third selectively engageable clutches and the first and second selectively engageable brakes.

7. An electric variable transmission with three forward modes, one reverse mode, and five fixed gears, comprising:
    a first, second, and third planetary gear set, wherein the first, second, and third planetary gear sets are interconnected;
    an input shaft directly connected to the third planetary gear set;
    a first electric motor connected to the third planetary gear set and to the second planetary gear set through a first selectively engageable clutch;
    a second electric motor connected to first planetary gear set;
    a transmission housing connected to the first planetary gear set through a first selectively engageable brake and a second selectively engageable brake;
    a second selectively engageable clutch connected between the second and third planetary gear set;
    and an output shaft directly connected to the first planetary gear set and the third planetary gear set through a third selectively engageable clutch.

8. The electric variable transmission of claim 7, wherein the first and second planetary gear sets comprise a simple planetary gear set, and wherein the third planetary gear set comprises a compound planetary gear set.

9. The electric variable transmission of claim 8, wherein the first planetary gear set comprises a first sun gear, a first ring gear, and a first planetary pinion rotatably mounted on a first planetary carrier, wherein the first planetary pinion is disposed in a meshing relationship with the first sun and first ring gears;
    wherein the second planetary gear set comprises a second sun gear, a second ring gear, and a second planetary pinion rotatably mounted on a second planetary carrier, wherein the second planetary pinion is disposed in a meshing relationship with the second sun and second ring gears;
    and wherein the third planetary gear set comprises a third sun gear, a third ring gear, and third planetary pinions rotatably mounted on a third planetary carrier, wherein the third planetary pinions are disposed in a meshing relationship with the third sun and third ring gears.

10. The electric variable transmission of claim 9, wherein connections in the electric variable transmission comprise:
- the input shaft connected to the third planetary carrier;
- the first electric motor connected the third sun gear and to the second planetary carrier through the first selectively engageable clutch;
- the second electric motor connected to the first sun gear;
- the first sun gear connected to the transmission housing through the first selectively engageable brake;
- the first ring gear connected to the transmission housing through the second selectively engageable brake;
- the first planetary carrier connected to the output shaft;
- the second sun gear connected to the first sun gear;
- the second ring gear connected to the third ring gear;
- the second planetary carrier connected to the third planetary carrier through the second selectively engageable clutch;
- and the third ring gear connected to the output shaft through the third selectively engageable clutch.

11. The electric variable transmission of claim 7, wherein the first and second electric motors are disposed in front of the first, second, and third planetary gear sets.

12. The electric variable transmission of claim 7, wherein the electric variable transmission comprises three forward electric variable transmission modes, one reverse electric variable transmission mode, and five fixed gears;
- and wherein the three forward electric variable transmission modes, one reverse electric variable transmission mode, and five fixed gears are selectively engageable through the first, second, and third selectively engageable clutches and the first and second selectively engageable brakes.

13. An electric variable transmission with three forward modes, one reverse mode, five fixed gears, and a center motor design, comprising:
- a first, second, and third planetary gear set, wherein the first, second, and third planetary gear sets are interconnected;
- an input shaft directly connected to the second planetary gear set;
- a first electric motor connected to second planetary gear set;
- a second electric motor connected to the first and the third planetary gear sets, wherein the first and second electric motors are located between the second and the third planetary gear sets;
- a transmission housing connected to the first planetary gear set through a first selectively engageable brake and to the third planetary gear set through a second selectively engageable brake;
- a first selectively engageable clutch and a second selectively engageable clutch connected between the first and second planetary gear set;
- and an output shaft directly connected to the third planetary gear set and to the first planetary gear set through a third selectively engageable clutch.

14. The electric variable transmission of claim 13, wherein the first and third planetary gear sets comprise a simple planetary gear set, and wherein the second planetary gear set comprises a compound planetary gear set.

15. The electric variable transmission of claim 14, wherein the first planetary gear set comprises a first sun gear, a first ring gear, and a first planetary pinion rotatably mounted on a first planetary carrier, wherein the first planetary pinion is disposed in a meshing relationship with the first sun and first ring gears;
- wherein the second planetary gear set comprises a second sun gear, a second ring gear, and second planetary pinions rotatably mounted on a second planetary carrier, wherein the second planetary pinions are disposed in a meshing relationship with the second sun and second ring gears;
- and wherein the third planetary gear set comprises a third sun gear, a third ring gear, and a third planetary pinion rotatably mounted on a third planetary carrier, wherein the third planetary pinion is disposed in a meshing relationship with the third sun and third ring gears.

16. The electric variable transmission of claim 15, wherein connections in the electric variable transmission comprise:
- the input shaft connected to the second planetary carrier;
- the first electric motor connected to the second sun gear;
- the second electric motor connected to the first and third sun gear;
- the first ring gear connected to the second ring gear and to the output shaft through the third selectively engageable clutch;
- the first planetary carrier connected to the second planetary carrier through the second selectively engageable clutch and to the second sun gear through the first selectively engageable clutch;
- the second ring gear connected to the first ring gear;
- the second planetary carrier connected to the input shaft, to the first planetary carrier through the second selectively engageable clutch, and to the second sun gear through the first selectively engageable clutch;
- the third sun gear connected to the transmission housing through the first selectively engageable brake, to the second electric motor, and to the first sun gear;
- the third ring gear connected to the transmission housing through the second selectively engageable brake;
- and the third planetary carrier connected to the output shaft and to the first ring gear through the third selectively engageable clutch.

17. The electric variable transmission of claim 13, wherein the electric variable transmission comprises three forward electric variable transmission modes, one reverse electric variable transmission mode, and five fixed gears;
- and wherein the three forward electric variable transmission modes, one reverse electric variable transmission mode, and five fixed gears are selectively engageable through the first, second, and third selectively engageable clutches and the first and second selectively engageable brakes.

18. An electric variable transmission with three forward modes, one reverse mode, five fixed gears, and a front and center motor design, comprising:
- a first, second, and third planetary gear set, wherein the first, second, and third planetary gear sets are interconnected;
- an input shaft connected to the first planetary gear set;
- a first electric motor connected to the first planetary gear set and to the second planetary gear set through a first selectively engageable clutch;
- a second electric motor connected to the first and the third planetary gear sets, wherein the second electric motor is located between the second and the third planetary gear sets;
- a transmission housing connected to the second planetary gear set through an overrunning clutch and to the third planetary gear set through a first selectively engageable brake;
- a second selectively engageable clutch connected between the first and second planetary gear set;

a second selectively engageable brake connected between the second and third planetary gear sets and the second electric motor;

and an output shaft connected to the third planetary gear set and to the first and second planetary gear sets through a third selectively engageable clutch.

19. The electric variable transmission of claim 18, wherein the first and second planetary gear sets comprise a compound planetary gear set, and wherein the third planetary gear set comprises a simple planetary gear set.

20. The electric variable transmission of claim 19, wherein the first planetary gear set comprises a first sun gear, a first ring gear, and first planetary pinions rotatably mounted on a first planetary carrier, wherein the first planetary pinions are disposed in a meshing relationship with the first sun and first ring gears;

wherein the second planetary gear set comprises a second sun gear, a second ring gear, and second planetary pinions rotatably mounted on a second planetary carrier, wherein the second planetary pinions are disposed in a meshing relationship with the second sun and second ring gears;

and wherein the third planetary gear set comprises a third sun gear, a third ring gear, and a third planetary pinion rotatably mounted on a third planetary carrier, wherein the third planetary pinion is disposed in a meshing relationship with the third sun and third ring gears.

21. The electric variable transmission of claim 19, wherein connections in the electric variable transmission comprise:

the input shaft connected to the first planetary carrier;

the first electric motor connected to the first sun gear and the second ring gear through the first selectively engageable clutch;

the second electric motor connected to the second sun gear, the third sun gear, and the second selectively engageable brake;

the first ring gear connected to the second planetary carrier and to the output shaft through the third selectively engageable clutch;

the first planetary carrier connected to the input shaft and to the second ring gear through the second selectively engageable clutch;

the second sun gear connected to the second electric motor, to the transmission housing through the second selectively engageable brake, and to the third sun gear;

the second ring gear connected to the first planetary carrier through the second selectively engageable clutch and to the first electric motor and the first sun gear through the first selectively engageable clutch;

the second planetary carrier connected to the first ring gear, to the overrunning clutch, and to the output shaft through the third selectively engageable clutch;

the third sun gear connected to the transmission housing through the second selectively engageable brake, to the second electric motor, and to the second sun gear;

the third ring gear connected to the transmission housing through the first selectively engageable brake;

and the third planetary carrier connected to the output shaft and to the second planetary carrier and the first ring gear through the third selectively engageable clutch.

22. The electric variable transmission of claim 19, wherein connections in the electric variable transmission comprise:

the input shaft connected to the first planetary carrier;

the first electric motor connected to the first sun gear and the second ring gear through the first selectively engageable clutch;

the second electric motor connected to the second sun gear, the third sun gear, and to the transmission housing through the second selectively engageable brake;

the first ring gear connected to the second planetary carrier and to the output shaft through the third selectively engageable clutch;

the first planetary carrier connected to the input shaft and to the second ring gear through the second selectively engageable clutch;

the second sun gear connected to the second electric motor, to the transmission housing through the second selectively engageable brake, and to the third sun gear;

the second ring gear connected to the first planetary carrier through the second selectively engageable clutch and to the first electric motor and the first sun gear through the first selectively engageable clutch;

the second planetary carrier connected to the first ring gear, to the overrunning clutch, and to the output shaft through the third selectively engageable clutch;

the third sun gear connected to the transmission housing through the second selectively engageable brake, to the second electric motor, and to the second sun gear;

the third ring gear connected to the transmission housing through the first selectively engageable brake;

and the third planetary carrier connected to the output shaft and to the second planetary carrier and the first ring guar through the third selectively engageable clutch.

* * * * *